United States Patent
Johansson

(10) Patent No.: US 9,725,045 B2
(45) Date of Patent: Aug. 8, 2017

(54) TORQUE LIMITING DEVICE AND A LOAD CARRIER FOOT COMPRISING A TORQUE LIMITING DEVICE

(71) Applicant: Thule Sweden AB, Hillerstorp (SE)

(72) Inventor: Claes Johansson, Åsenhöga (SE)

(73) Assignee: Thule Sweden AB, Hillerstorp (SE)

( * ) Notice: Subject to any disclaimer, the term of this patent is extended or adjusted under 35 U.S.C. 154(b) by 20 days.

(21) Appl. No.: 14/653,752

(22) PCT Filed: Dec. 20, 2013

(86) PCT No.: PCT/EP2013/077624
§ 371 (c)(1),
(2) Date: Jun. 18, 2015

(87) PCT Pub. No.: WO2014/096327
PCT Pub. Date: Jun. 26, 2014

(65) Prior Publication Data
US 2016/0193969 A1    Jul. 7, 2016

(30) Foreign Application Priority Data

Dec. 21, 2012 (EP) .................... 12199223

(51) Int. Cl.
*B60R 9/058* (2006.01)
*F16B 31/02* (2006.01)
(Continued)

(52) U.S. Cl.
CPC ............ *B60R 9/058* (2013.01); *B25B 13/481* (2013.01); *B25B 23/1422* (2013.01); *F16B 31/027* (2013.01); *F16B 2/10* (2013.01)

(58) Field of Classification Search
CPC .......... F16B 31/027; F16B 2/10; B60R 9/058; B25B 23/1422
See application file for complete search history.

(56) References Cited

U.S. PATENT DOCUMENTS 4,101,061 A * 7/1978 Sage .................... B60R 9/055
224/322
4,109,691 A * 8/1978 Wilson .................. B25B 15/004
411/3

(Continued)

FOREIGN PATENT DOCUMENTS

| DE | 27 10 222 | 9/1978 |
|---|---|---|
| DE | 10 2011 007556 | 10/2012 |
| WO | WO 2010/088971 | 8/2010 |

OTHER PUBLICATIONS

International Search Report and Written Opinion of the International Searching Authority for International Appl. No. PCT/EP2013/077624, European Patent Office, Rijswijk, Netherlands, mailing date of Sep. 8, 2014, 14 pages.

(Continued)

*Primary Examiner* — Brian D Nash
(74) *Attorney, Agent, or Firm* — Sterne, Kessler, Goldstein & Fox P.L.L.C.

(57) ABSTRACT

A torque limiting device (30) connectable to a load carrier, such as a load carrier foot (10), and adapted for indicating a torque imparted by a user, the torque limiting device (30) comprising a torque limiter (50), a connection member (31) adapted to be connected to the load carrier foot (10) and a head portion (40) arranged on the connection member (31), the head portion (40) comprising a first and a second member (41, 42). The disclosure also relates to a load carrier foot (10) comprising the torque limiting device (30). The torque limiting device (30) is specifically adapted to be user friendly and has a space saving configuration.

19 Claims, 13 Drawing Sheets

(51) Int. Cl.
 *B25B 13/48* (2006.01)
 *B25B 23/142* (2006.01)
 *F16B 2/10* (2006.01)

(56) References Cited

U.S. PATENT DOCUMENTS

| | | | | |
|---|---|---|---|---|
| 4,586,638 A * | 5/1986 | Prescott | ................. | B60R 9/058 |
| | | | | 224/320 |
| 4,995,538 A | 2/1991 | Marengo | | |
| 5,794,826 A * | 8/1998 | Cronce | ................. | B60R 9/045 |
| | | | | 116/200 |
| 5,826,765 A * | 10/1998 | Rak | ................. | B60R 9/045 |
| | | | | 224/321 |
| 5,845,828 A * | 12/1998 | Settelmayer | ............ | B60R 9/045 |
| | | | | 224/321 |
| 5,913,465 A * | 6/1999 | Potter | ................. | B60R 9/058 |
| | | | | 224/321 |
| 6,070,774 A | 6/2000 | Rak et al. | | |
| 6,309,154 B1 * | 10/2001 | Higgins | ................. | F16B 31/027 |
| | | | | 411/7 |
| 6,824,215 B2 * | 11/2004 | Koepke | ................. | A47C 1/023 |
| | | | | 297/337 |
| 8,348,111 B2 * | 1/2013 | Heuchert | ................. | B60R 9/048 |
| | | | | 224/321 |
| 8,764,361 B2 * | 7/2014 | Seaman | ................. | A47K 13/26 |
| | | | | 411/125 |
| 9,194,417 B2 * | 11/2015 | Marchand | ............. | F16B 31/027 |
| 2014/0137612 A1 * | 5/2014 | Gresse | ................. | F16B 31/027 |
| | | | | 70/158 |
| 2015/0224939 A1 * | 8/2015 | Flaherty | ................. | B60R 9/048 |
| | | | | 74/491 |
| 2015/0240857 A1 * | 8/2015 | Simanca | ................. | B25B 15/00 |
| | | | | 411/383 |
| 2016/0207470 A1 * | 7/2016 | Zander | ................. | B60R 9/048 |

OTHER PUBLICATIONS

European Search Report for European Application No. EP 12 19 9223.4, European Patent Office, Munich. Germany, dated May 6, 2013, 4 pages.

* cited by examiner

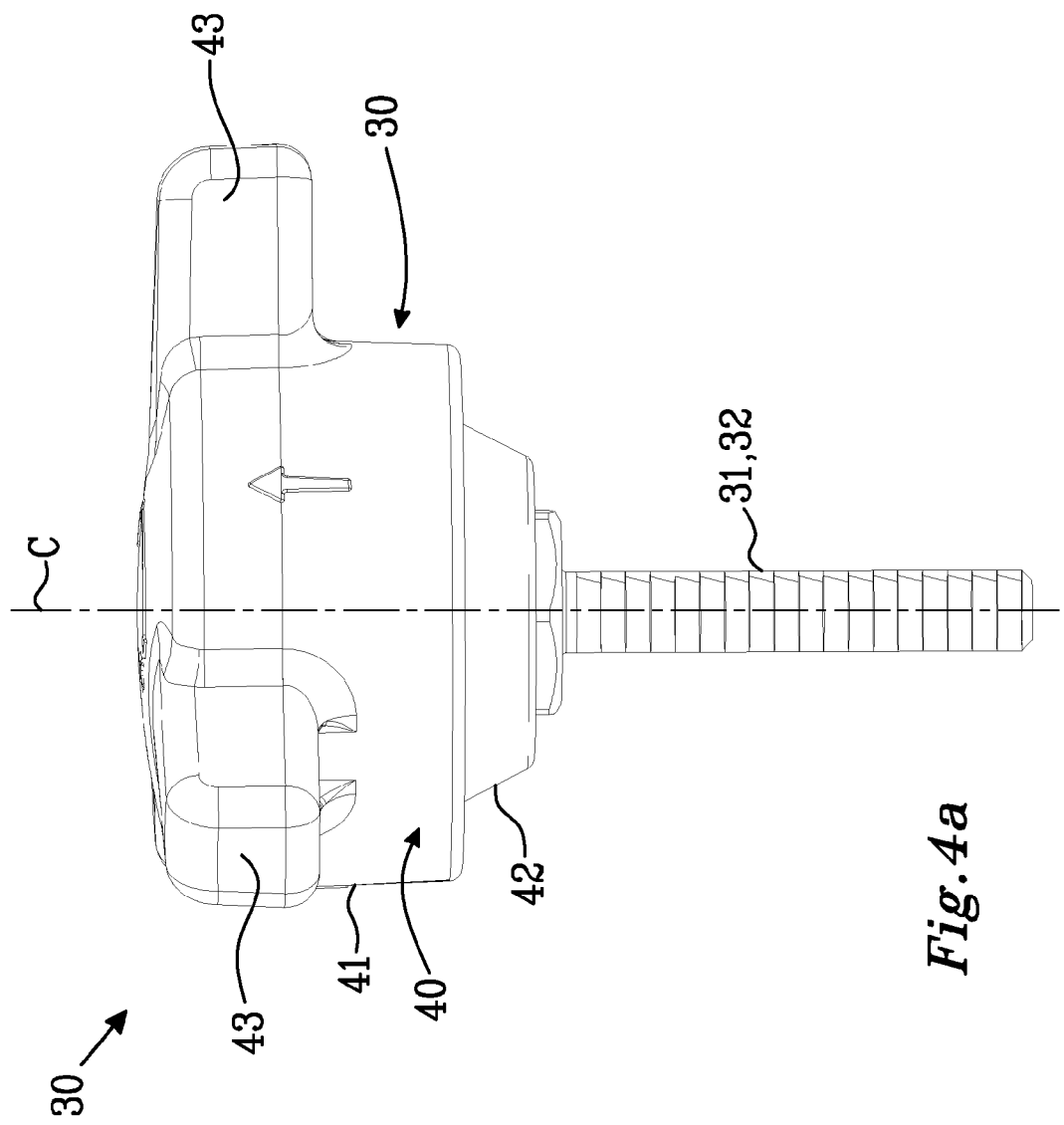

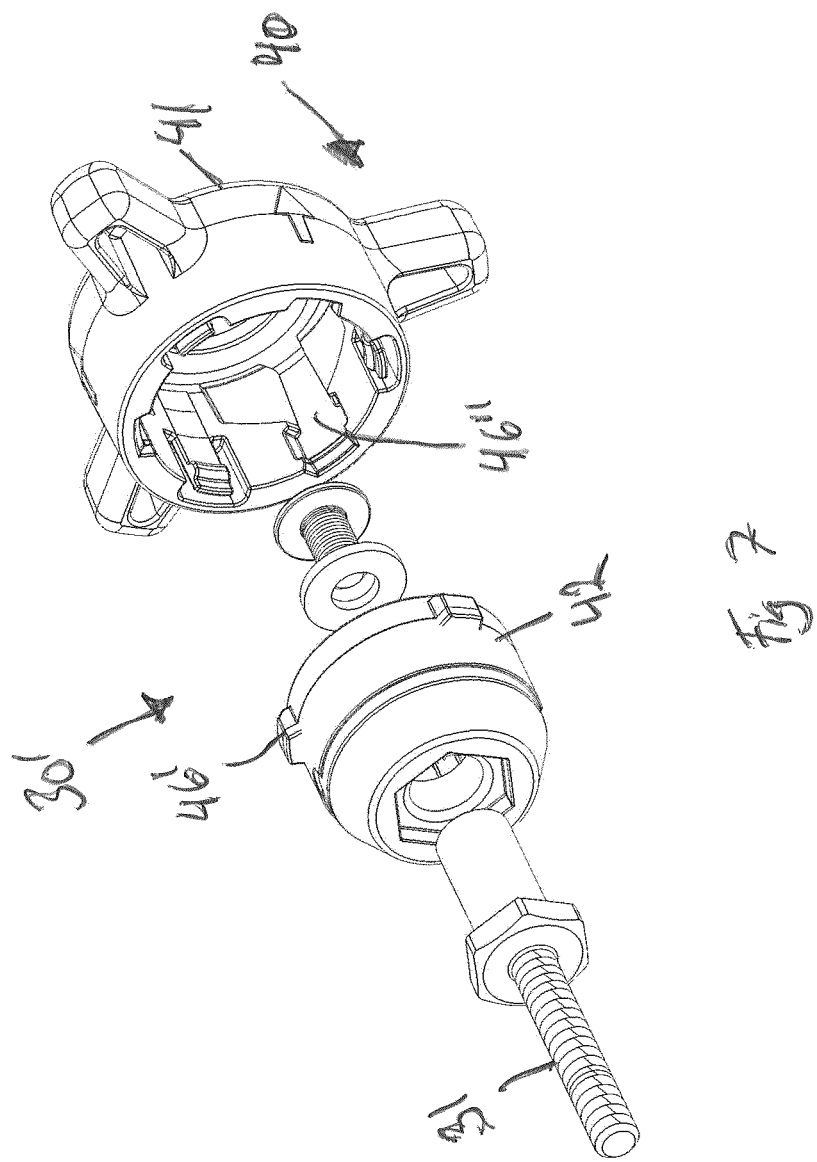

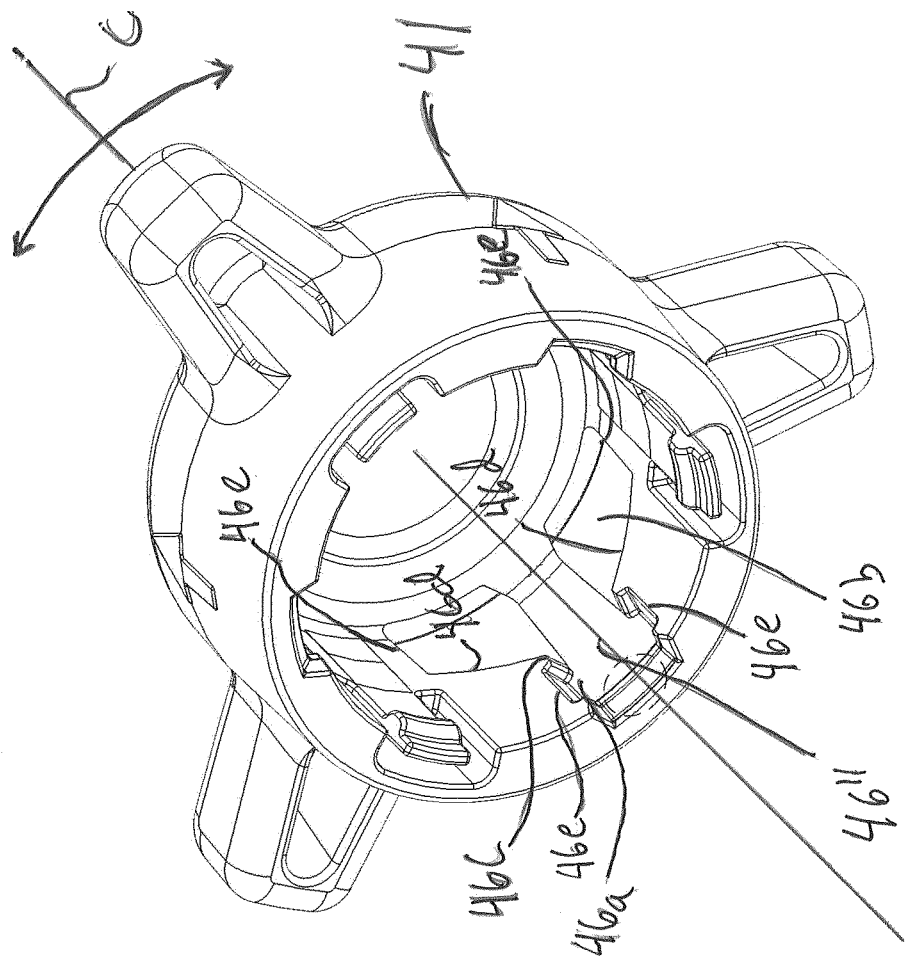

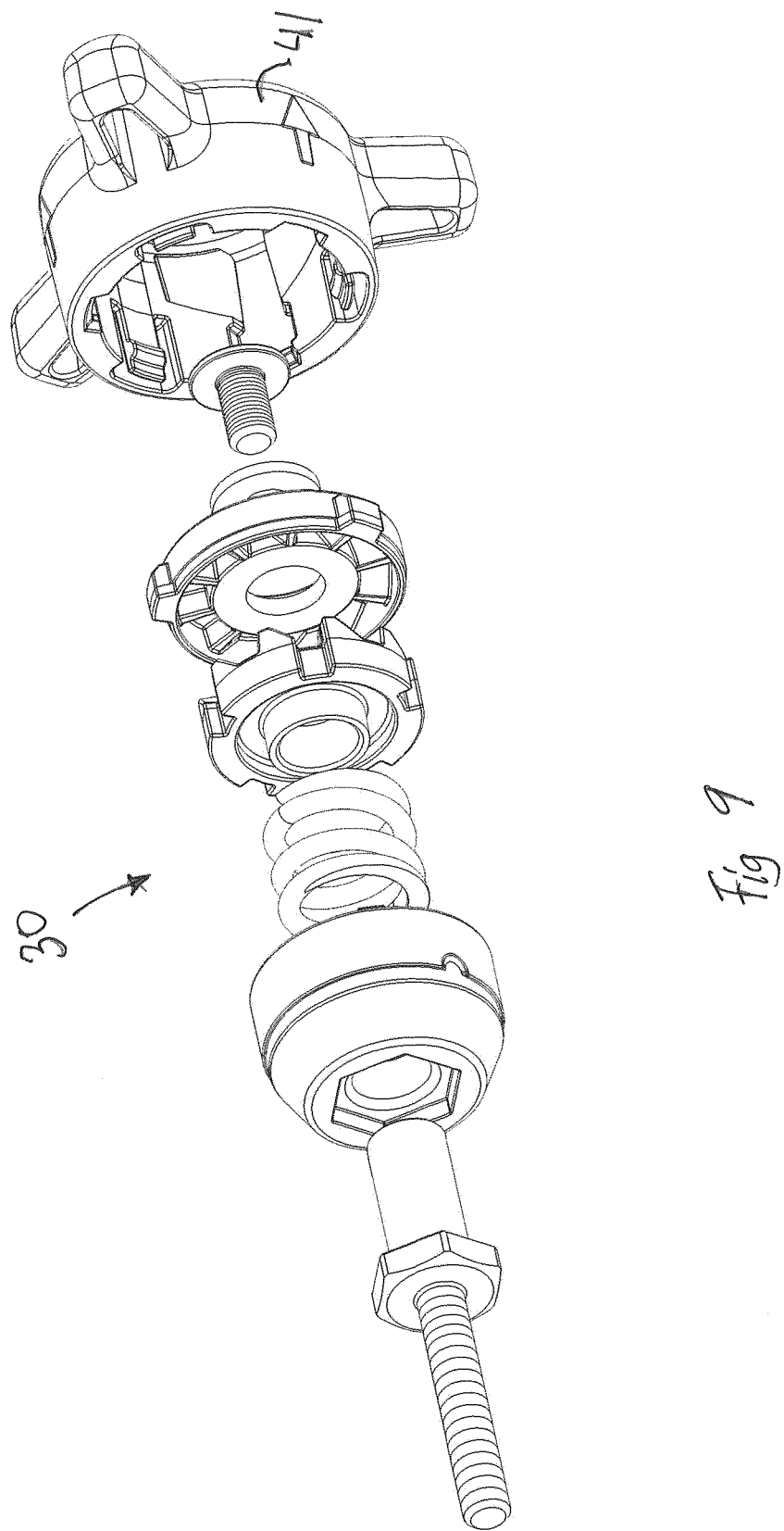

TORQUE LIMITING DEVICE AND A LOAD CARRIER FOOT COMPRISING A TORQUE LIMITING DEVICE

TECHNICAL FIELD

A torque limiting device and a load carrier foot for a roof rack comprising a torque limiting device. The torque limiting device is specifically adapted to confined and limited space inside of a load carrier foot.

BACKGROUND

Roof racks comprising a load carrier bar and a first and a second load carrier foot are widely used to provide an automobile with an extended load capacity. When an automobile collides, either with another moving automobile or with a stationary object, the crash violence imparted to the vehicle is usually significant and can impair severe structural damages the automobile. A load, carried on a roof rack, has its own inertia as the automobile moves. In case of a collision, it is very important that the load on the roof rack is not accidentally released from the roof rack but remains on the roof rack. Equally important is that the roof rack itself is safely retained to the automobile. Throughout the development of the load carrier foot for roof racks, safety has always been a premiered function.

Tools, such as wrenches, are usually used to provide a strong coupling and to readily fix the load carrier foot to the roof of the automobile. However, using tools such as a wrench is not always optimal from a user perspective. It may be that a tool is not available, hence to achieve real ease of use, a load carrier foot which can be fixed to the roof of an automobile without a tool i.e. which a user can fix with his/hers own hands, is preferable. It may also be that when using tools, the load carrier foot is attached to hard, i.e. too much torque is transferred, so that the attachment fittings on the vehicle, or in the load carrier foot is damaged.

The published international patent application No. WO 2010/088971 A1 discloses a torque indicator device, which is constructed to indicate the amount of transferable torque between a user and the load carrier foot. However, in confined spaces the solutions in WO 2010/088971 A1 are not very attractive. There is thus also a need for a torque transfer device, with a torque limiting function or not, which can be used and incorporated with a load carrier having a relatively low amount of available space inside.

SUMMARY

It is an object of the present invention to provide a torque limiting device which can be utilized in the confined space available inside of a load carrier foot, while at the same time provide for a comfortable grip to a user, or to reduce at least some of the drawbacks of the prior art, or to at least provide for a useful alternative to the prior art. The object is at least partly met by a torque limiting device connectable to a load carrier, preferably a load carrier foot, and adapted for indicating a torque imparted by a user.

The torque limiting device comprises a torque limiter, a connection member adapted to be connected to the load carrier foot and a head portion arranged on the connection member. The head portion comprises a first and a second member. The first member is adapted to be displaced with respect to the second member to an extended position, so as to provide for an extendable head portion.

The torque limiting device provides for a torque indicating function, while at the same time being comfortable and easy to use and a compact configuration. A torque limiting device according to embodiments herein is thus very suitable for a load carrier foot with restricted or limited space.

According to an aspect, the first member of the head portion is telescopically displaceable with respect to the second member of the head portion, preferably in a direction substantially parallel with the connection member. The first member can be displaceable a distance D from 3-50 mm, advantageously from 3-40 mm, preferably from 5-30 mm with respect to the second member. A telescopically displaceable first member provides for a head portion of the torque limiting device which is extra suitable for confined spaces.

According to an aspect, the first member of the head portion can be rotated freely, or optionally a limited amount of degrees about the longitudinal center axis C. It is advantageous if the first member can rotate ±90 degrees, preferably ±45 degrees more preferably ±30 degrees about the longitudinal center axis C. By permitting the first member to be able to rotate, the first member can be stored inside of a load carrier foot in an easy manner. It is common that the available space inside of a load carrier foot is very limited, and sometimes a hood, or lid, used to close the load carrier foot to protect it from rain and dirt, can be difficult to close as the head portion can obstruct the hood or lid.

According to an aspect, the torque limiter is arranged inside of the second member of the head portion. In an embodiment, the torque limiter is formed by ramped teeth, and can effectively be covered from dirt or other pollutants by being positioned inside the second member. The first member is then suitably encompassing at least a portion of the second member of the head portion. The first and the second members are thus generally has a cylinder like interior in which the torque limiter, or torque limiter mechanism, can be positioned.

According to an aspect the first member of the head portion is adapted to be engaged with the torque limiter when is the first member of the head portion is in the extended position. By restricting the positions in which the first member can engage the torque limiter, the risk of accidentally release the load carrier foot is significantly reduced. In an embodiment, the first member can have one position in which the first member is engaged with the torque limiter and a second position in which the torque limiter is disengaged from the torque limiter. In one embodiment herein, the torque limiter is at least partly formed by a first and a second disc having opposing ramped teeth, or any other suitable torque transferring means such as opposing and cooperating grooves and protrusions or the like. According to an aspect the first member of the head portion is disengaged from the torque limiter when the first member of the head portion is in a retracted position.

According to an aspect the first member of the head portion is in the form of a handle, such as a turning wheel or the like. This provides for a comfortable grip to the user.

According to an aspect the torque limiter comprises a first and a second disc adapted to disengage from each other at a predetermined threshold level of torque, and in that the first member of the head portion is adapted to engage the first disc at least when positioned in the extended position, optionally, the first member can permanently engage the first disc. At least one of the first or the second discs can be cooperating with biasing means, such as a spring.

The torque limiting device according to any one of the preceding claims, wherein the connection member is a screw. The connection member advantageously extends through an aperture of the bracket.

According to a second aspect, the invention relates to a load carrier foot comprising a torque limiting device as disclosed herein, or as disclosed in any one of the appended claims. The torque limiting device can be permanently attached to the load carrier foot, or be detachable form the load carrier foot.

According to an aspect a torque transfer device is provided. The torque transfer device is adapted to be connected to a load carrier foot and to impart a torque to the load carrier foot upon rotation. The torque transfer device comprises a connection member, such as a screw, adapted to be connected to the load carrier foot and a head portion arranged to the connection member. The connection member comprises a longitudinal centre axis about which the torque transfer device is adapted to rotate. The head portion comprises a first and a second member. The first member has a first position in which the first member engages the second member so that torque can be transferred from the first member to the connection member via the second member. The first member is further adapted to rotate about the longitudinal centre axis and with respect to the second member a limited amount of degrees when being in the first position before torque can be transferred. The first member can optionally be adapted to be displaced with respect to the second member to an extended position, so as to provide for an extendable head portion.

According to an aspect, a torque transfer device connectable to a load carrier foot and adapted to transfer a torque via a rotational motion by a user is provided. The torque transfer device comprises a connection member, such as a screw, connectable to the load carrier foot. The torque transfer device further comprises a head portion arranged on the connection member, preferably at one end thereof. The head portion comprising a first and a second member, the first member is adapted to be displaced with respect to the second member from a retracted position to an extended position so as to provide for an extendable head portion. The first member and the second members are configured to cooperate so that when the first member is in the extended and/or retracted position, the first member can be rotated a limited amount of degrees without transferring torque to the connection member.

According to an aspect, the first member can by a rotational motion be positioned so that the first member is prevented from being displaced from the extended position back to the retracted position. The first member is prevented from being displaced along the longitudinal center axis of the torque transfer device from the extended position back to the retracted position.

The limited amount of degrees can be equal or less than ±350 degrees, ±180 degrees, ±90 degrees, equal or less than ±45 degrees, or equal or less than ±36 degrees, or equal or less than 25 degrees, preferably about the longitudinal center axis of the torque transfer device.

The first and the second members comprise at least one groove and at least one cooperating protrusion. The at least one groove and at least one cooperating protrusion configured so that when the first member is in the extended and/or retracted position, the first member can be rotated a limited amount of degrees without transferring torque to the connection member.

The first and the second members comprise at least one groove and at least one cooperating protrusion, wherein the groove comprises a first and/or a second portion with rotation stops.

The rotation stops prevents the first member from rotating fully around the longitudinal axis of the torque transfer device. It permits a limited rotation of the first member which has the benefits of permitting the first member to interact with a hood, or lid, of the load carrier foot to provide a lock preventing the torque transfer device from accidentally unscrewing itself, e.g. due to vibrations throughout the vehicle. It permits the first member of the head portion to be slightly offset to better and more snugly fit the head portion inside of a load carrier foot when the hood, or lid of the load carrier foot is closed.

The first and the second portions can be separated by a neck portion. The second portion of the groove may further have angled side walls so that the first member is guided to a correct position when the first member is displaced to the extended position.

BRIEF DESCRIPTION OF THE DRAWINGS

Non-limiting embodiments will be described in greater detail with reference to the accompanying figures in which;

FIG. 4a shows the torque limiting device of FIG. 3 as seen from the side and with the first member of the head portion in a retracted position;

FIG. 7 shows an exploded view of a torque transfer device;

FIG. 8 shows the first member of the head portion of the torque transfer device of FIG. 7 in greater detail and;

FIG. 9 shows an exploded view of the torque limiting device according to an embodiment having a first member shown in FIG. 8.

DETAILED DESCRIPTION OF PREFERRED EMBODIMENTS

Figure 1:
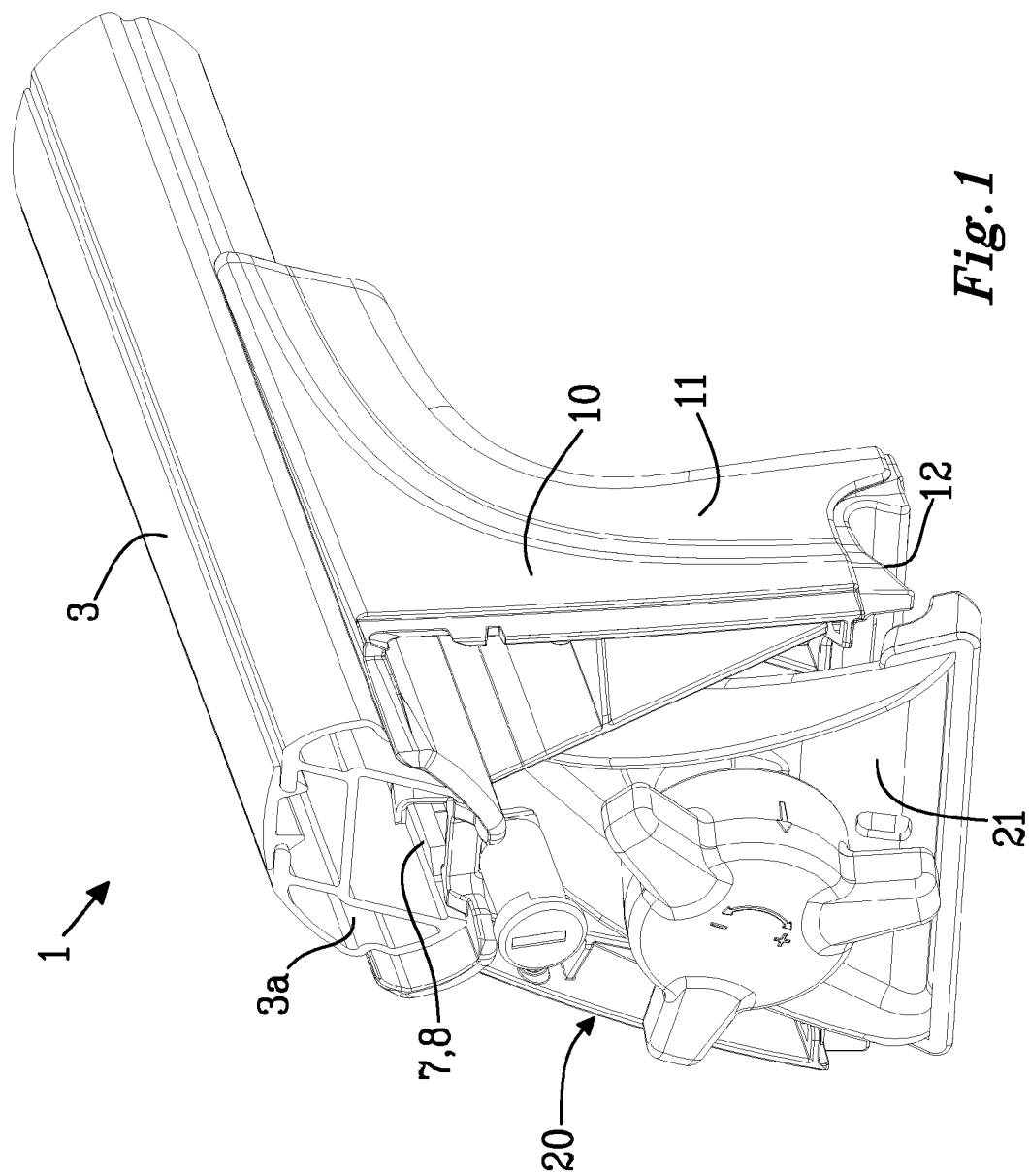
FIG. 1 shows parts of a roof rack with a view in perspective, and comprising a load carrier foot comprising a torque limiting device.
Figure 2:
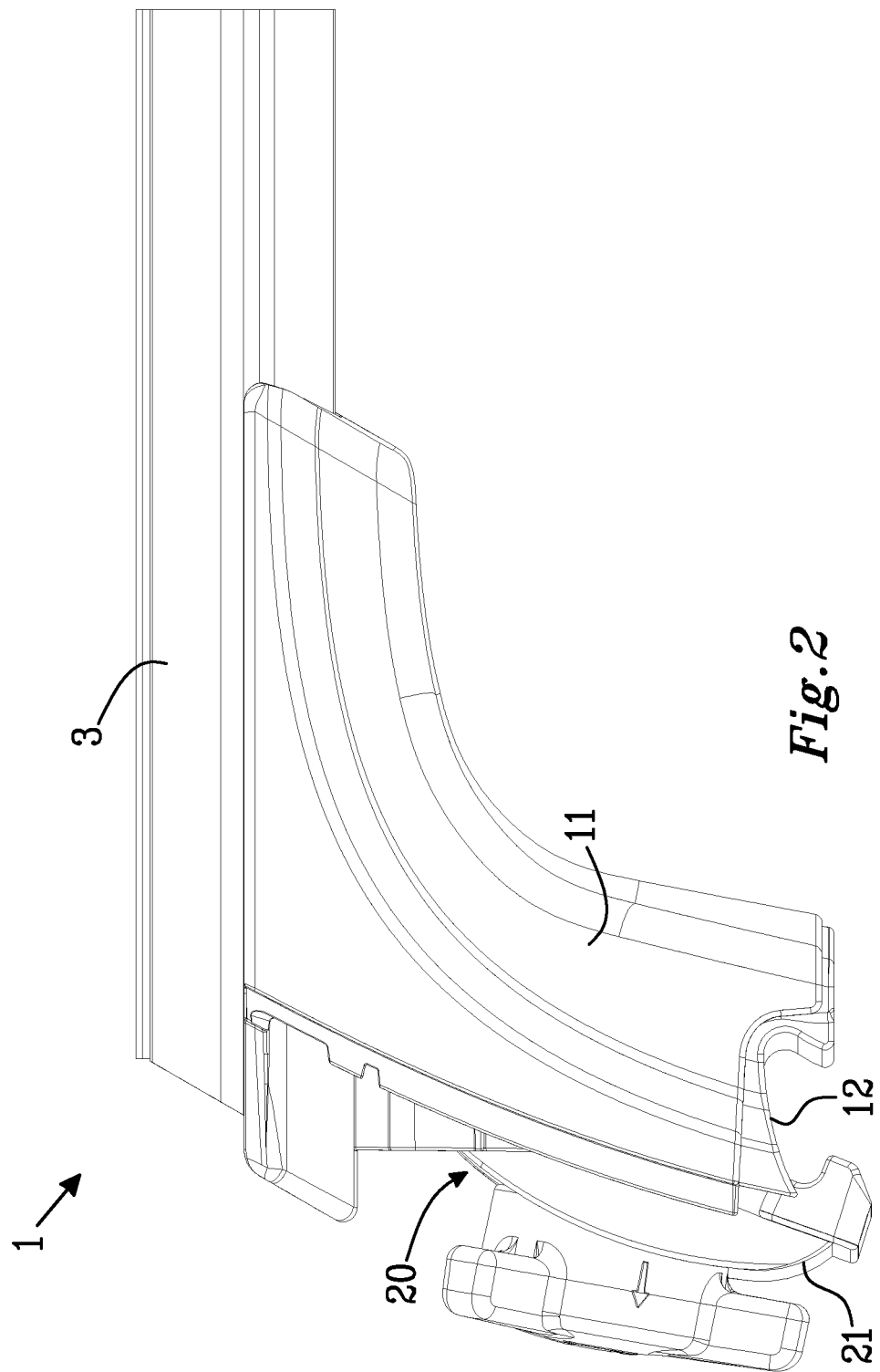
FIG. 2 shows parts of a roof rack with a view towards the side, and comprising a load carrier foot comprising a torque limiting device.

FIG. 1 shows parts of a roof rack 1 for a vehicle (not shown) with a view in perspective. FIG. 2 shows the parts of the roof rack 1 with a view towards the side of the roof rack 1. With reference to FIGS. 1 and 2, the roof rack 1 comprises a load carrier bar 3 and at least one load carrier foot 10, preferably a first and a second load carrier foot 10. The load carrier foot 10 is in this case a clamp rack load carrier foot, but hereafter only referred to as a load carrier foot. The roof rack 1 is generally used to provide a vehicle, such as an automobile, with an increased load capacity. The load carrier foot 10 comprises a body 11 comprising a support surface 12 adapted to rest against a surface of the vehicle, preferably against a rail of the vehicle. The load carrier foot 10 is illustrated without a protective cap which is intended to protect the interior of the load carrier foot 10 from pollutants, dirt, weather and other potentially damaging factors.

The load carrier foot 10 comprises an attachment arrangement 20 for attaching the load carrier foot 10 to the vehicle and more precisely the rail of the vehicle. The attachment arrangement 20 comprises a grip member, in the form of a bracket 21, adapted to grip about the rail of the vehicle and to provide a clamping force between the bracket 21 and the support surface 12 of the body 11 of the load carrier foot 10.

Figure 3:
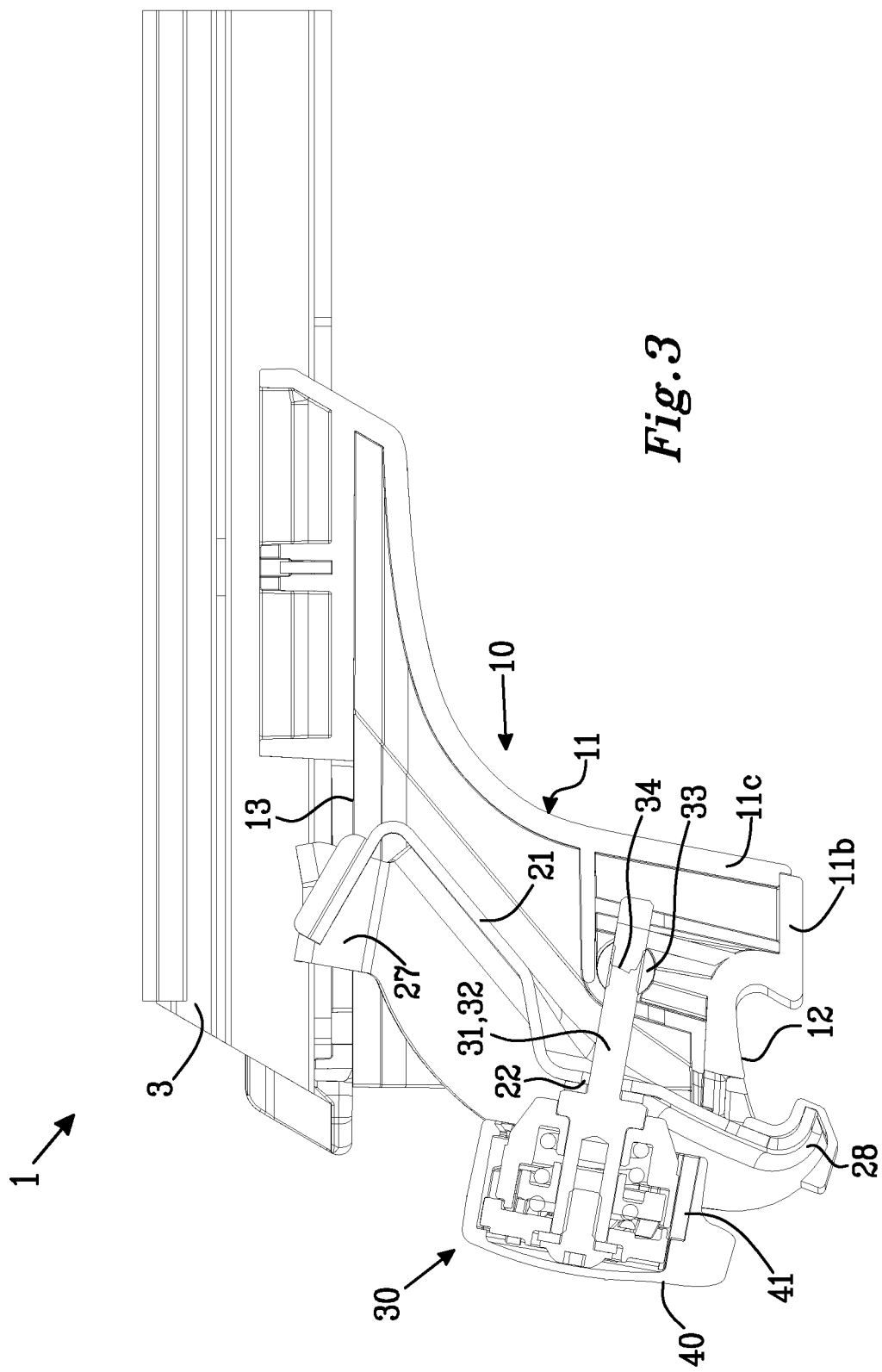
FIG. 3 shows a cross sectional view of the load carrier foot of FIGS. 1 and 2.

FIG. 3 is a cross section the embodiment shown in FIG. 2. FIG. 3 shows the load carrier bar 3, the load carrier foot 10, the body 11 and bracket 21. The bracket 21, which can be manufactured from sheet metal such as sheet steel, or any suitable composite or resin based material. The bracket 21 comprising the load carrier bar retaining portion 27 and the a rail retaining portion 28 can preferably be formed in one unitary piece of material, although at least the load carrier retaining bar portion 27 and a rail retaining portion 28 can be individual parts connect to at least one intermediate member or directly with each other.

The bracket 21 and the body 11 of the load carrier foot 10 are adapted to cooperate with a tension mechanism, a tensioner in the form of a torque limiting device, to impart a torque to the bracket 21 and thus the clamping force between the bracket 21 and the support surface 12 of the load carrier foot 10. The torque limiting device 30 is specifically adapted to restrict the amount of transferable torque and can optionally be adapted to provide the user with a signal indicative of when a specified amount of torque has been imparted to reduce, or remove, the risk that a too small amount and/or a too high amount of torque is imparted.

The body 11 can be formed by one or more individual members. For example, the torque limiting device 30 can be pivotally connected a base member 11b comprising the support surface 12 and connected to a bar carrying member 11c. The bar carrying member 11c comprises a load carrier bar receiving surface 13. The support surface 12 advantageously comprises a rubber like material to provide high friction yet a lenient surface towards the vehicle and the rail of a vehicle is such is present.

The torque limiting device 30 is connectable to a load carrier, such as a load carrier foot, a roof rack, a roof box, a bicycle carrier, a support assembly for a bicycle carrier. The torque limiting device 30 comprises a connection member 31, in the shown embodiment screw 32, which can be connected to the body 11. The connection member 31, i.e. the screw 32, extends through an aperture 22 in the bracket. The torque limiting device 30 can be detachably connected or permanently connected. In the shown embodiment, the connection member 31 comprises threads and is threadably engaged with a pivot axle 33, forming a pivot axis 34 about which the connection member can pivot. The pivot axle 33 is arranged to the body 11 of the load carrier foot 10 in such a way that the pivot axle 33 can rotate about the pivot axis 34. As the torque limiting device 30 is rotated, the connection member 31 can move back or forth along in a direction shown with the arrow A in FIG. 3.

The torque limiting device 30 also comprises a head portion 40. The head portion 40 is adapted so that a user may turn the head portion 40, and thus the connection member 31, to impart a clamping force between the bracket 21 and the support surface 12 of the load carrier foot 10. The head portion 40 is further extendable, in the shown embodiment the head portion is telescopically extendable, to provide for an extendable head portion 40. An extendable head portion provides the user with a better grip about the head portion 40, and thus to easier rotate the connection member 31, and in the end to impart a higher torque to the torque limiting device 30. The torque limiting device 30 will be described in greater detail hereafter.

Figure 4B:
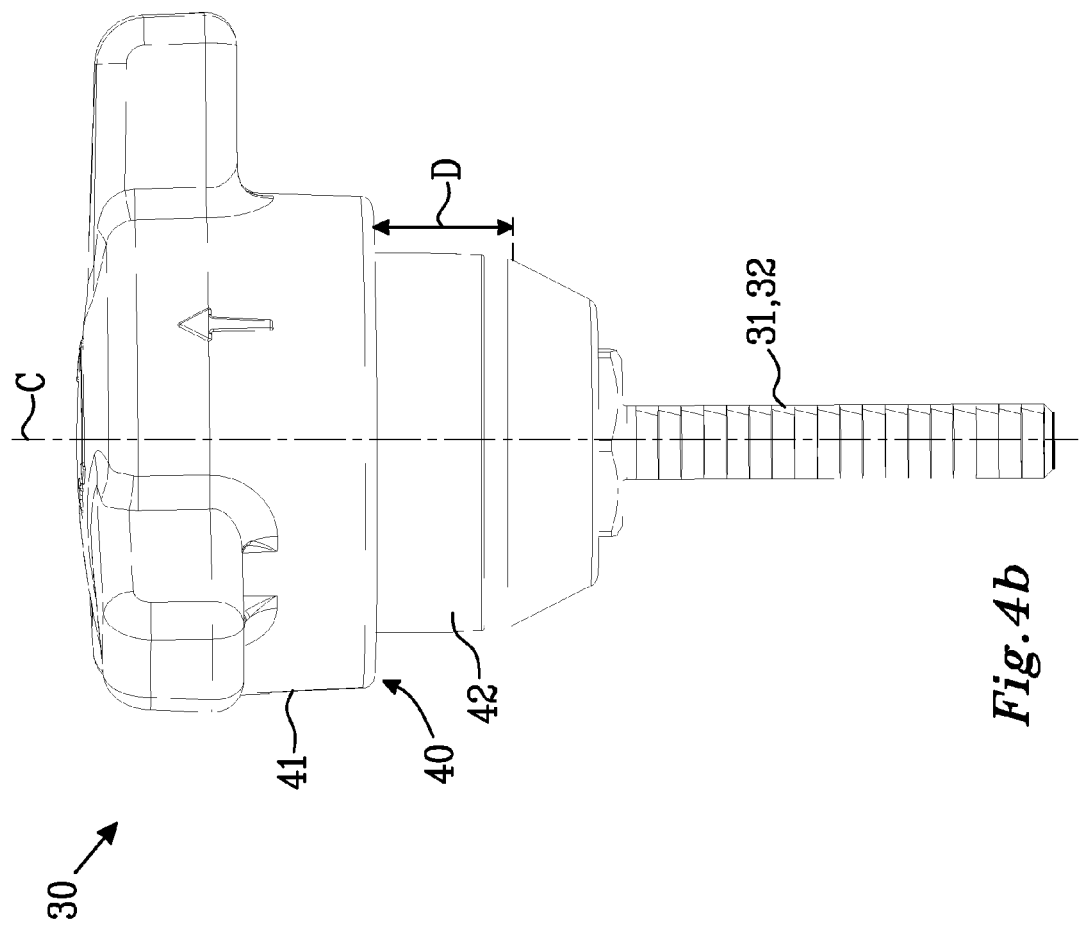
FIG. 4b shows the torque limiting device of FIG. 3 as seen from the side and with the first member of the head portion in an extracted position.

FIGS. 4a-4b show the torque limiting device 30, comprising a longitudinal center axis C, in greater detail and with a view towards the side. FIGS. 4a-4b further show, the connection member 31, in the form of a screw 32 comprising threads, the head member 40 comprising a first and a second member 41, 42. The head portion further comprises a torque limiter, or a torque limiting mechanism, operable between the first and the second members 41, 42 of the head portion 40. The first member 41 has a grip friendly configuration comprising grip protrusions 43 adapted to interact with a user's fingers during rotation of the head portion 40 and forming a handle. In the shown embodiment, the first member comprises three grip protrusions 43, although only two are visible. It is possible that the first member 41 comprises one, two, three, four, five, six or more grip protrusions. The first member 41 has substantially the form of a cap, covering the interior defined by the second member 42, as will be described below. The first and the second members 41, 42 has a substantially tubular interior, the first member 41 encompassing at least a portion of the second member 42.

As can be seen in FIG. 4b, the first member 41 is displaceable with respect to the second member 42. The head portion 40 can be extendable providing a user with a better and more comfortable grip about the head portion. It is believed that a better and more comfortable grip enables a user to easier rotate the head portion 40, and thus the connection member 31. It also provides a space saving torque limiting device, which is very useful as the available space inside in a load carrier foot is very limited. As is noticeable in FIGS. 4a-4b, the first member 41 of the head portion 40, is telescopically displaceable with respect to the second member 42. The first and the second members 41, 42 are connected together by means of a slip connection, which permits the first member 41 to be slid with respect to the second member 42. The first member 41 can be displaceable a distance D, as outlined in FIG. 4b, from 3-50 mm, advantageously from 3-40 mm, preferably from 5-30 mm with respect to the second member 42.

Figure 5A:
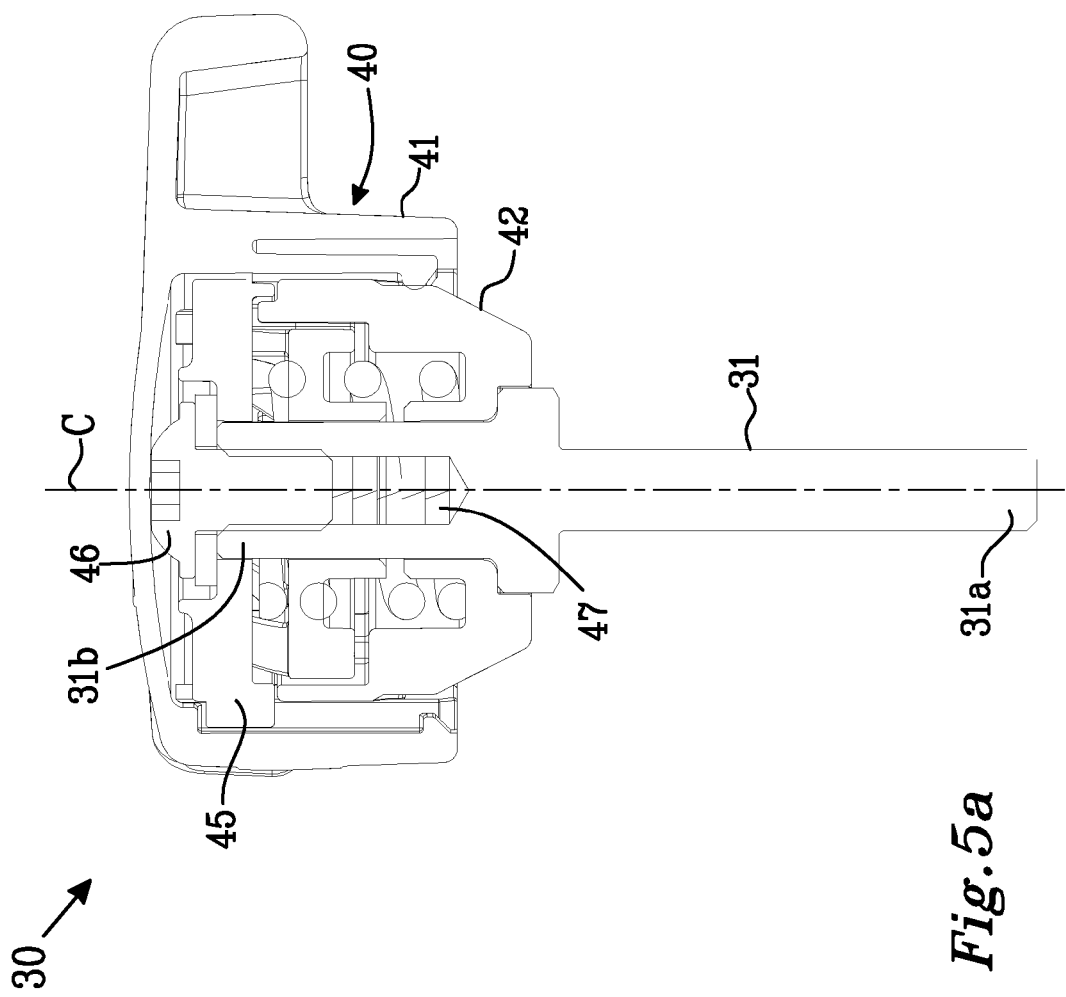
FIG. 5a shows a cross sectional view of the torque limiting device of FIG. 3 as seen from the side and with the first member of the head portion in a retracted position.
Figure 5B:
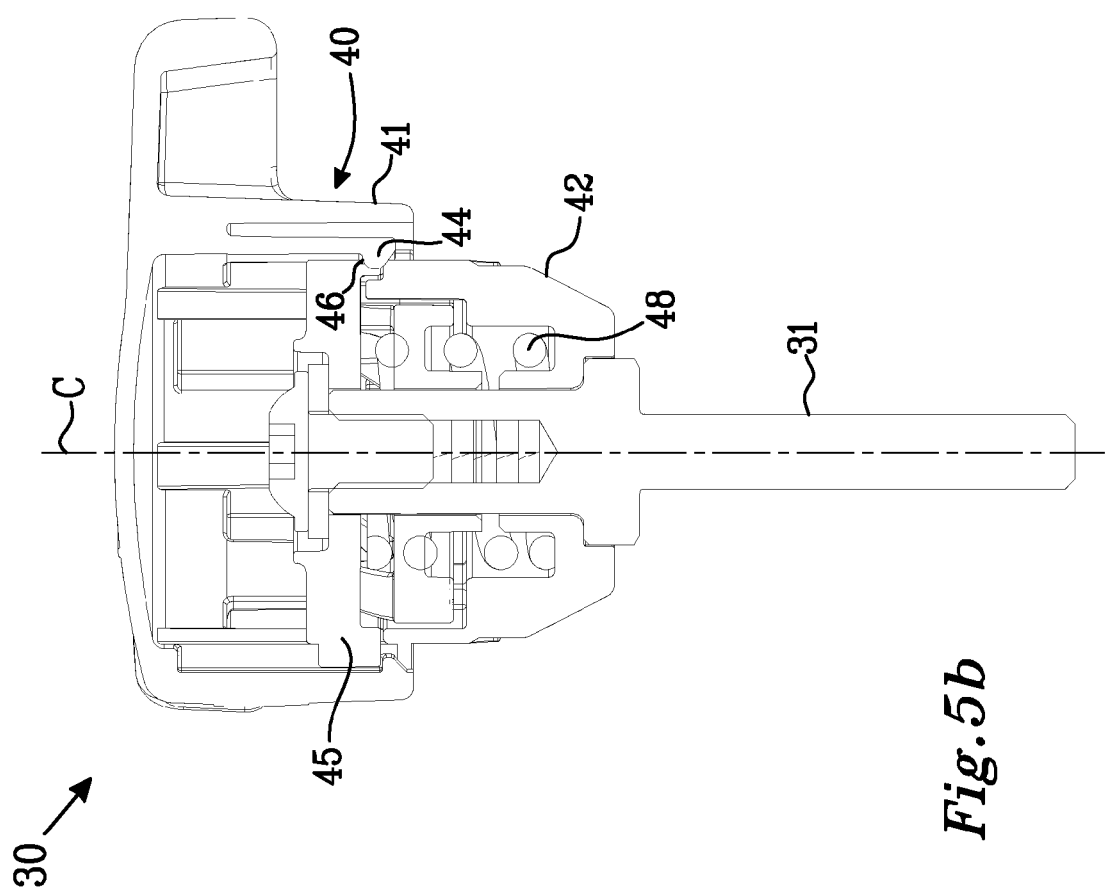
FIG. 5b shows a cross sectional view of the torque limiting device of FIG. 3 as seen from the side and with the first member of the head portion in an extended position.

FIGS. 5a-5b show a cross sectional view of the torque limiting device 30 of FIGS. 4a-4b. FIG. 5a shows the head portion 40 in a retracted position, i.e. a non-extended position, and FIG. 5b shows the head portion 40 in an extended position, i.e. the first member 41 has been telescopically displaced with respect to the second member 42. When the first member 41 of the head portion is in the retracted position, the first member 41 can rotate freely about the longitudinal center axis C, preferably without imparting any torque to the connection member 31. This would enable the first member 41 to easily be positioned in either a space saving position or in a position advantageous for telescopically extending the head portion 40.

Alternatively, the first member 41 can rotate a limited amount of degrees about the longitudinal center axis C. The first member 41 can rotate equal or less than ±90 degrees, preferably equal or less than ±45 degrees more preferably equal or less than ±36, or equal or less than ±25 degrees about the longitudinal center axis C.

Optionally, in another embodiment, the first member 41 of the head portion 40 is locked from rotation about the longitudinal center axis C when being in the retracted position. However, when the first member 41 of the head portion 40 is in the extended position, as shown in FIG. 5*b* the first member 41 engages indirectly a portion of the connection member 31 so that a rotational motion of the first member 41 can be transferred to the connection member 31. It may be of course that the first member 41 of the head portion is always engaged with a portion of the connection member 31 so that a rotational motion of the first member 41 can be transferred to the connection member 31.

In an embodiment, the first member 41 of the head portion can be locked, or at least restricted from displacement, when being in the retracted position. The first member 41 of the head portion 40 can advantageously be locked in a retracted position, preferably by being positioned in a retracted locked position, from which the first member 41 cannot be displaced to the extended position, or from which the first member 41 is at least restricted from being displaced to the extended position. In a locked position, the first member 41 cannot be displaced to the extended position at least not directly, and the head portion 40 is effectively prevented from being extended.

In the embodiment shown in FIGS. 4*a*-5*b*, the first member 41 of the head portion 40 engages the connection member 31 via an intermediate member, such as a disc, rod or the like, fixed from rotation with respect to the connection member 31. The connection member 31 comprises a first and a second end 31*a*, 31*b*. The first end 31*a* of the connection member 31 is adapted to be connected to the body 11 of the load carrier foot 10, as described above for example, and the second end 31*b* of the connection member 31 comprises means for engaging the first member 41 of the head portion 40.

More precisely, the second end 31*b* comprises a first disc 45. The first disc 45 is fixed to the connection member 31 using a screw 32 which engages the second end 31*b* of the connection member 31 via a threaded aperture 47 in the connection member 31. The first disc 45 could however be fixed in any other suitable way to the connection member 31.

When the first member 41 of the head portion is displaced between the extended and retracted position, flanges 44 of the first member 41 guides a portion of the first disc 45, and more specifically lock protrusions 46, as shown in FIG. 5*b* and FIGS. 6*a*-6*c*. An advantage with this is that the first member 41 of the head portion 40 comprises an L-formed groove L (referred to as L in FIG. 6*c*), partly formed by the flanges 44 of the first member 41, in which the lock protrusions 46 of the first disc 45 are adapted to slide along (indicated with dashed lines in FIGS. 6*c*). The L-shaped groove L provides the function of preventing the first member 41 from being displaced from the extracted position to the retracted position, at least when the first member 41 of rotated. This prevents a user form accidentally injuring his/hers hand while rotating the first member 41 of the head portion 40. In an embodiment, the L-shaped groove L is a T-shaped groove, provides the function of preventing the first member 41 from being displaced from the extracted position to the retracted position, when the first member 41 of rotated in a clock wise or counter clock wise direction. The first member 41 can have at least one L-shaped groove L, or at least one T-shaped groove, or more.

In an embodiment, the first member 41 of the head portion 40 can only transfer torque to the connection member 31 when the first member 41 of the head portion 40 is in the extended position in the shown embodiment. Optionally, a spring member (not shown) can bias the first portion 41 of the head portion 40 towards the retracted position, to reduce the risk that the first member 41 of the head portion 40 accidentally engages the first disc 45.

The torque limiting device 30 comprises a torque limiter 50 which prevents a user from imparting too much torque. It may, but does not necessarily, provide the user with a signal, the signal can be visual, audial or tactile, or combinations thereof such as tactiovisual, audiovisual, tactioaudial or the like, and/or optionally the torque limiter can simply operate as a torque limiter only, preventing a torque threshold level to be exceeded. The torque limiter 50 of the torque limiting device 30 can be configured using the principles as described in the published international application No. WO2010088971 A1 for example.

Figure 6A:
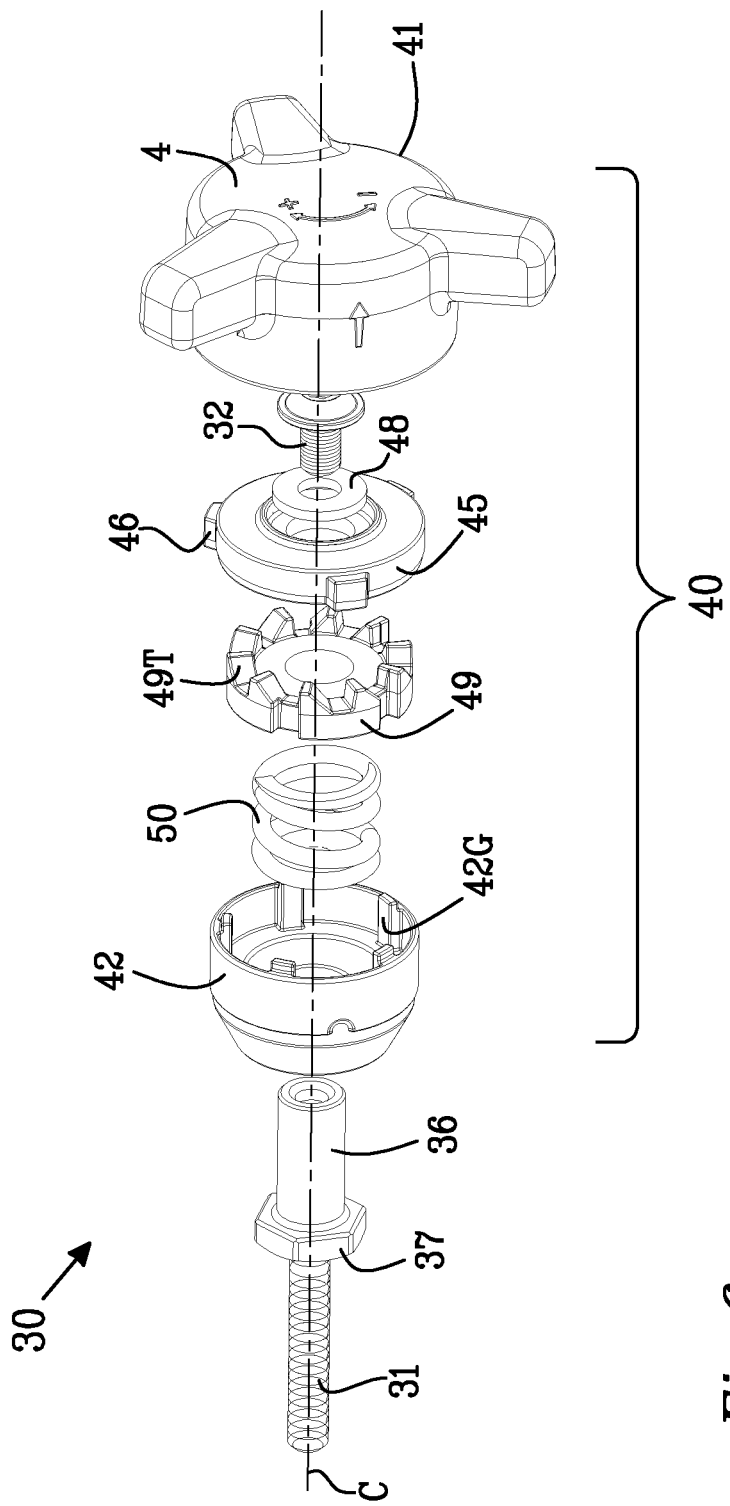
FIGS. 6a-6c show an exploded view of the torque limiting device of FIG. 3 and in different perspectives.
Figure 6B:
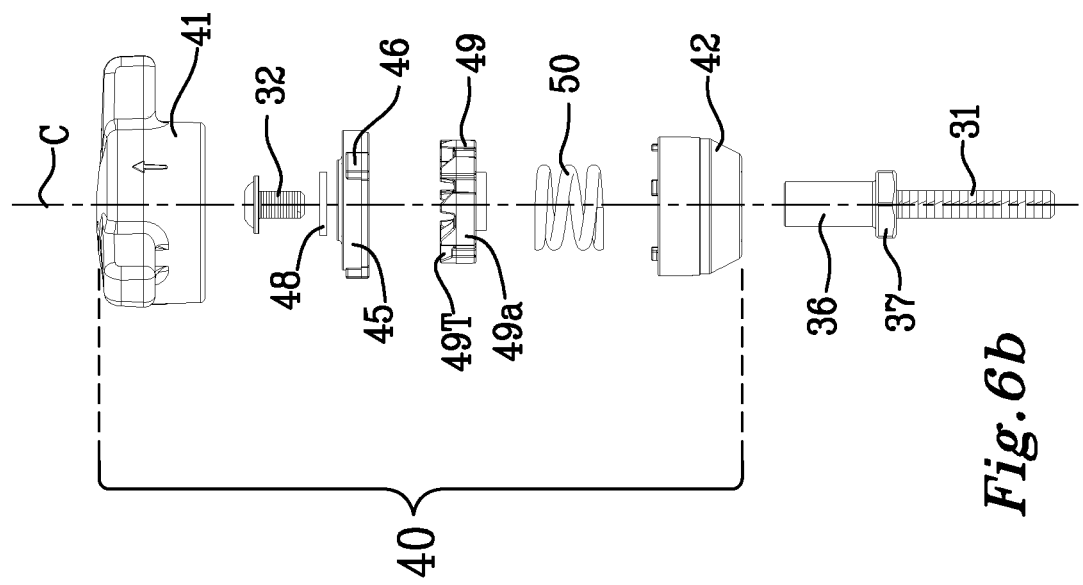
Figure 6C:
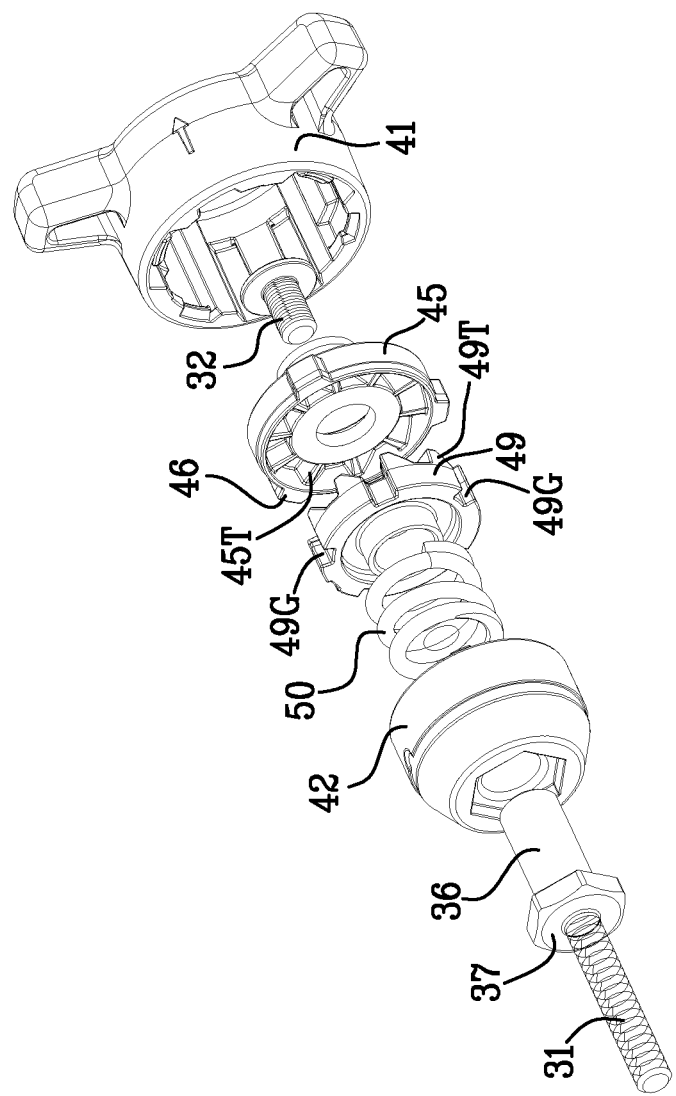

Different exploded views of the torque limiting device 30 of FIGS. 4*a*-5*b* is shown in FIGS. 6*a*-6*c*. With reference to FIGS. 6*a*-6*c*, FIGS. 6*a*-6*c* show the connection member 31 and the head portion 40 comprising the first member 41 forming a handle. The screw 32 assists in retaining the elements of the head portion 40 to the connection member 31, more specifically a washer 48, the first disc 45, a second disc 49, a helical spring 51 and the second member 42 of the head portion 40.

The connection member 31 comprises a cylinder receiving section 36 on which the second member 42, the helical spring 51, the second disc 49, and the first disc 45 are slipped. A stop 37, in the form of a nut, prevents the displacement of the second member 42 of the head portion 40 into the threaded section of the connection member 31 and of prevents the second member 42 of the head portion 40 from rotating about the longitudinal center axis C. The second disc 49 comprises upwardly projecting ramped teeth 49T and, as can be noted, grooves 49G which are adapted to interact with cooperating flanges 42G (shown in FIG. 6*a*) of the second member 42 of the head portion 40. The second disc 49 is thus displaceable along the longitudinal center axis C of the torque limiting device 30 but prevented from being rotated about the longitudinal center axis C of the torque limiting device 30. A suitable amount of ramped teeth on the second disc 49 ranges from 1-100, preferably 4-20. The helical spring 51 biases the upwardly projecting ramped teeth 49T into engagement with downwardly projecting ramped teeth 45T on the first disc 45. The force exerted by the helical spring 51 and the angle of the downwardly—and upwardly projecting ramped teeth 45T, 49T are the main factors determining the maximum transferable torque between the first and the second members 41, 42 of the head portion 40. The maximum transferable torque is suitably selected to be 2-6 Newtonmeter (Nm) tightening torque using hand pressure.

An advantage with the embodiments described is that the first member 41 of the head portion 40 comprises an L-formed groove, partly formed by the flanges 44 of the first member 41, which the lock protrusion 46 of the first disc 45 is adapted to cooperate with. When the first member 41 of the head portion is in the extended position, the lock protrusions 46, as shown in FIG. 5*b* and FIGS. 6*a*-6*c*, engages the horizontal portion of the L-shape (the shorter part of the L), and is thereby temporarily preventing the first member 41 from being displaced from the extended position, at least as long as the first member 41 is imparted with a rotational motion in a clock wise direction. It is of course possible that the first disc 45 is arranged with a groove and the first member 41 is arranged with an L-shaped guiding protrusion instead.

FIG. 7 shows an embodiment of a torque transfer device 30', which do not have a torque limiting function as described above. The torque transfer device 30' is connectable to the load carrier foot 10 as described above, or can be removable connected dependent on the function desired.

The torque transfer device 30' is adapted to transfer a torque via a rational motion by a user, and comprises a connection member 31 connectable to the load carrier foot 10. It further comprises a head portion 40 arranged on the connection member 31. The head portion 40 is used by the user when transferring torque and operates as a handle. The head portion 40 comprises a first and a second member 41, 42. As described above, it's the first member 40 which serves the main function as handle by which the user transfers torque by rotational motion to the load carrier foot 10 to attach or detach the load carrier foot 10 from a vehicle.

Just like the torque limiting device 30 described above, the first member 41 is adapted to be displaced with respect to the second member 42 from a retracted position to an extended position, so as to provide for an extendable head portion 40. The first member 41 and the second members 42 are configured to cooperate so that when the first member 41 is in the extended and/or retracted position, the first member 41 can be rotated limited amount of degrees without transferring torque to the connection member 31. Rotate a limited amount of degrees as compared to the term freely rotatable, is intended to mean that the first member cannot rotate a full 360 degrees, but is restricted in how much the first member can rotate before torque is transferred.

The first and the second members 41, 42 comprise cooperating grooves and protrusions 46', 46". The first member 41 comprises 3 identical grooves 46", but could have one or more grooves fulfilling the same function described herein. Hereafter only one groove 46" will be described.

FIG. 8 shows the interior of the first member 41 in greater detail. As is noticed, the first member has a bowl like form and is adapted to at least partly encompass a portion of the second member 42 (not shown in FIG. 8). The second member has a bowl shaped form with an aperture through which the connection member 31 may protrude and be attached thereto, as seen in FIGS. 5a-5b for example. The first and the second members 41, 42 are positioned so that the openings of the bowl shaped forms are facing in opposing directions as illustrated in FIGS. 5a-5b for example.

FIG. 8 further shows one of the grooves 46" in greater detail. The groove 46" has a first and a second portion 46a, 46b permitting the protrusion 46 of the second member 42 a defined play, thus enabling the first member 41 to be displaced, i.e. rotated, a limited amount of degrees about the longitudinal center line C as indicated with the arrow in FIG. 8. Between the first and the second portion 46a, 46b of the groove 46" is a neck portion 46c. The second portion 46b of the groove 46" has angled walls 46d, guiding the protrusion 46 of the second member 42 to the first portion 46a of the groove 46". This will permit the first member 41 when displaced from the retracted position to the extended position, as shown in FIGS. 5a-5b, to easily slip from the second portion 46b through the neck portion 46c and to the first portion 46a.

As is noticeable from the form and extension of the second portion 46b of the groove 46", the first member 41 will be permitted to rotate a limited amount of degrees about the longitudinal center line C. In the shown embodiment, the first member 41 can rotate ±30 degrees about the longitudinal center line C. As is also noticeable, the first and the second portion 46a, 46b has rotation stops 46e so that the amount the first member 41 is permitted to rotate is limited before the first member 41 is imparting a torque to the second member 42 (not shown in FIG. 8). The distance between the rotation stops 46e define the amount of degrees which the first member 41 is permitted to rotate without imparting a torque to the connection member 31. The distance may vary of course dependent of the desired properties of the first member 41.

When the first member 41 is in the retracted position, the limited amount of rotational degrees provides a preventive measure or means for the torque transfer device 30' from being accidentally unscrewed. If the connection member 31 is a screw having threads, there is always a risk that a torque limiting device or a torque transfer device can be accidentally unscrewed after being mounted to a load carrier foot, even when covered inside of a load carrier foot, such as the load carrier foot 10 described herein. The first member 41 can interact with a hood, or lid, to the load carrier foot which can operate as a rotational lock to the first member 41, thereby prevent the torque transfer device from being accidentally unscrewed. It should be noted that even if a torque transfer device or a torque limiting device as described herein is not fully unscrewed from the load carrier foot, it may have severe consequences if the grip of the load carrier foot to the vehicle is reduced even a little bit.

Another advantage is that the limited amount of rotation permitted by the first member when being in the retracted position is that it permits the first member to be slightly displaced without torque being imparted to the connection member 31. This enables a hood, or lid, to a load carrier foot to be closed easily as the first member be slightly offset to be positioned in a more favorable position permitting the hood, or lid, to be more easily closed.

The first portion 46a of the groove 46" permits the first member 41 to be rotated a small amount of degrees, in this case ±5 degrees about the longitudinal center line C, without imparting a torque to the connection member 31. A general suitable interval which the first portion is configured to permit the first member to rotate is from ±3-25 degrees. This prevents the first member 41 from accidentally be displaced from the retracted position to the extended position when a user is rotating the first member 41 to impart a torque to the connection member 31, and thus the load carrier foot to attach a load carrier foot or to detach a load carrier foot from a vehicle.

FIG. 9 shows a torque limiting device 30 adapted to transfer a torque to a load carrier foot to attach or detach a load carrier foot to a vehicle. The torque limiting device 30 is the same in function and features as the torque limiting device 30 described above but having the first member 41 as described with respect to FIGS. 7 and 8. Giving the torque limiting device 30 the same advantages as the torque transfer device 30'.

The method for mounting the roof rack 1 will hereafter be described with reference to FIG. 3. The user asserts that the bracket 21 of the load carrier foot 10 is adequately displaced with respect to the body 11, so that a wide gap is provided between the body 11 and the bracket 21. The load carrier foot 10 is thereafter mounted to the rail of a vehicle so that the support surface 12 of the load carrier foot 10 is resting against the rail. The bracket 21 is rested against a second surface of the rail. The user thereafter telescopically extends the head portion 40 to get a comfortable grip about the first member 41 of the head portion. The first member 41 advantageously has a configuration in which it is temporarily prevented from being displaced to the retracted position, at least when a user rotates the first member. Generally a user tends to push simultaneously as rotate during such maneuver. The first member can thus be arranged with means for preventing the first member from being displaced to the retracted position, e.g. such means can comprise a L, or T shaped groove with which a corresponding protrusion in working cooperation with the connection member 31 can cooperate.

A portion of the first member 41, and more specifically the flanges 44 of the first member 41 of the head portion 40, engages with the lock protrusions 46 of the first disc 45. As a user rotates the first member 41 of the head portion 40 when the first member 41 is in the extended position, the rotation is transferred to the connection member 31 which is displaced along the arrow A as seen in FIG. 3. As the transferred torque exceeds a predetermined threshold level, i.e. when the friction between the first and the second disc is no longer sufficient to withstand the level of imparted torque, the helical spring 51 is compressed and the upwardly projecting ramped teeth 49T are disengaged from the downwardly projecting ramped teeth 45T of the first disc 45, and the first member 41 of the head portion 40 is disabled from transferring a rotational motion to the connection member 31. At this stage, the first member 41 of the head portion 40 can rotate without imparting additional torque. The amount of torque transferred can thus be limited and the risk of imparting too much torque is significantly reduced.

When rotating clockwise, the bracket 21 is displaced so as to impart a clamping force between the bracket 21 and the support surface 12 of the body 11 and the load carrying foot 10 is readily secured to the rail of the vehicle. Rotating anti clock wise will release the bracket 21 and reduce or remove the clamping force between the bracket 21 and the support surface 12 of the load carrier foot 10.

To dismount the load carrier foot 10 from the vehicle, the method is performed in the reversed order.

The invention claimed is:

1. A torque limiting device connectable to a load carrier and adapted for indicating a torque imparted by a user, said torque limiting device comprising:
 a connection member adapted to be connected to the load carrier;
 a head portion arranged on said connection member, said head portion comprising a first member and a second member; and
 a torque limiter disposed in said head portion and adapted to limit torque to a predetermined threshold,
 wherein said head portion is extendable from a retracted position to an extended position,
 wherein said first member is outwardly displaceable with respect to said second member and said connection member in said extended position, and
 wherein said head portion in said extended position is configured to allow a user to grip said head portion.

2. The torque limiting device according to claim 1, wherein said first member is outwardly displaceable with respect to said second member in a direction substantially parallel with said connection member.

3. The torque limiting device according to claim 1, wherein said torque limiter is arranged inside of said second member of said head portion.

4. The torque limiting device according to claim 1, wherein said first member is encompassing at least a portion of said second member of said head portion.

5. The torque limiting device according to claim 1, wherein said first member of said head portion is adapted to be engaged with said torque limiter when said first member of said head portion is in said extended position.

6. The torque limiting device according to claim 1, wherein said first member of said head portion is disengaged from said torque limiter when said first member of said head portion is in the retracted position.

7. The torque limiting device according to claim 1, wherein said first member of said head portion is in the form of a handle.

8. The torque limiting device according to claim 1, wherein said torque limiter comprises a first and a second disc adapted to disengage from each other at a predetermined threshold level of torque, and wherein said first member of said head portion is adapted to engage said first disc at least when positioned in said extended position.

9. The torque limiting device according to claim 1, wherein said connection member is a screw.

10. The torque limiting device according to claim 1, wherein said head portion of said torque limiting device is adapted to cooperate with a bracket of said load carrier.

11. The torque limiting device according to claim 1, wherein said first member of said head portion can be positioned in a position in which said first member of said head portion is prevented from being displaced from said extended position to a retracted position, at least when being subjected to a force parallel with a longitudinal center axis.

12. The torque limiting device according to claim 1, wherein said first member of the head portion can be locked in the retracted position by being positioned in a retracted locked position from which said first member cannot be displaced to the extended position, or from which said first member is at least restricted from being displaced to the extended position.

13. The torque limiting device according to claim 1, wherein said first member of the head portion can be freely rotated when positioned in a retracted position.

14. The torque limiting device of claim 1, wherein the load carrier is a roof rack comprising:
 a load carrying bar; and
 a first and a second load carrier foot,
 wherein at least one of the first and the second load carrier foot comprises the torque limiting device.

15. A load carrier foot, comprising:
 a torque limiting device connectable to a load carrier and adapted for indicating a torque imparted by a user, said torque limiting device comprising:
 a connection member adapted to be connected to said load carrier foot;
 a head portion arranged on said connection member, said head portion comprising a first member and a second member; and
 a torque limiter disposed in said head portion and adapted to limit torque to a predetermined threshold,
 wherein said head portion is extendable from a retracted position to an extended position,
 wherein said first member is outwardly displaceable with respect to said second member and said connection member in said extended position, and
 wherein said head portion in said extended position is configured to allow a user to grip said head portion.

16. The load carrier foot according to claim 15, wherein said torque limiting device is detachably attached to said load carrier foot.

17. The load carrier foot according to claim 15, wherein said load carrier foot comprises a bracket comprising an aperture, and wherein said connection member extends through said aperture of said bracket and is pivotally connected to said body of said load carrier foot.

18. A load carrier foot, comprising:
 a torque limiting device connectable to a load carrier and adapted for indicating a torque imparted by a user, said torque limiting device comprising:

a connection member adapted to be connected to said load carrier foot;

a head portion arranged on said connection member, said head portion comprising a first member and a second member; and a torque limiter disposed in said head portion and adapted to limit torque to a predetermined threshold, wherein said head portion is extendable from a retracted position to an extended position, and wherein said first member is telescopically displaceable with respect to said second member in said extended position, wherein said load carrier foot comprises a bracket comprising an aperture, and wherein said connection member extends through said aperture of said bracket and is pivotally connected to said body of said load carrier foot.

19. A torque transfer device connectable to a load carrier foot and adapted to transfer a torque via a rotational motion by a user comprising:

a connection member connectable to the load carrier foot; and a head portion arranged on the connection member, the head portion comprising a first and a second member, wherein the first member is adapted to be outwardly displaced with respect to the entire second member from a retracted position to an extended position, so as to provide for an extendable head portion, and wherein the first member and the second member are configured to cooperate so that when the first member is in the extended or retracted position, the first member can be rotated a limited amount of degrees without transferring torque to the connection member.

* * * * *